United States Patent [19]

Kuhfus

[11] 3,919,497

[45] Nov. 11, 1975

[54] TELEPHONE HOUSING WITH CORD GROMMET AND SEAL

[75] Inventor: Gerd Kuhfus, London, Canada

[73] Assignee: Northern Electric Company Limited, Montreal, Canada

[22] Filed: Oct. 31, 1974

[21] Appl. No.: 519,546

[52] U.S. Cl. ............... 179/100 C; 179/178; 179/179

[51] Int. Cl.$^2$ ............................................ H04M 1/02

[58] Field of Search ........ 179/100 R, 100 C, 100 D, 179/178, 1 PC

[56] References Cited

UNITED STATES PATENTS

| | | | |
|---|---|---|---|
| 3,444,329 | 5/1969 | Krumreich | 179/100 R |
| 3,515,816 | 6/1970 | Laing | 179/100 R |
| 3,584,157 | 6/1971 | Prescott | 179/100 D |
| 3,643,205 | 2/1972 | Elkins | 179/100 R |
| 3,859,476 | 1/1975 | Morrell et al. | 179/100 C |

*Primary Examiner*—Kathleen H. Claffy
*Assistant Examiner*—Randall P. Myers
*Attorney, Agent, or Firm*—Sidney T. Jelly

[57] ABSTRACT

A telephone housing having an elongated aperture in its base surface for reception of a telephone and grommet, the grommet including a main portion enclosing the telephone cord and a channel formation extending around the grommet, the channel formation having an inner relatively stiff flange and an outer very flexible flange, the periphery of the aperture positioned in the channel formation when the grommet is inserted. Particularly the base surface has two portions extending at an obtuse angle to each other and the aperture is at the junction of the two portions and extends into each portion. The grommet can be inserted from either of two directions, the channel formation extending at an angle across the grommet. The grommet extends from the base surface in either of two directions enabling positioning the telephone housing on one or the other of the two portions of the base surface.

1 Claim, 14 Drawing Figures

TELEPHONE HOUSING WITH CORD GROMMET AND SEAL

This invention relates to telephone housings with cord grommets and seals and in particular is concerned with the provision of a cord connection to replace side-by-side plug-in connection for telephone units in which a speaker and microphone are provided to dispense with using a hand set. The invention is further related to the provision of cord connection to such units which are interchangeably desk or wall mounting.

It has been proposed to provide a conventional form of telephone unit, having normal dialling facilities and a normal handset, and a matching unit which can be plugged into the conventional telephone unit in a side-by-side position. A male connector is provided in a side wall of one of the units and a cooperating female connector in a side wall of the other unit. The two units are connected by pushing together. The matching unit can be provided with a speaker and microphone and suitable circuitry such that by pressing a pushbutton in the matching unit, the conventional telephone is used without removing the handset.

It has become desirable to be able to use the speaker and microphone unit in conjunction with existing types of telephone units which do not have provision for plugging in the speaker unit. To do this it is necessary to connect the speaker unit to the normal telephone unit by a flexible cord.

It is desirable that only one stock item be needed as far as the speaker unit is concerned. Therefore it is necessary to provide for the two alternative methods of connection: - side-by-side plug in and flexible cord.

To provide effective operation of the speaker unit it is desirable to substantially seal the housing. At the same time access must be provided for when a cord is to be connected, the cord entering the housing through a hole in one of the housing members. A further complication arises in that the speaker unit may be required to be positioned on a desk or table surface when used with a telephone also on such a surface, or hung on a wall or other vertical surface for use with a similarly mounted telephone. This requires, preferably, that the cord enter the housing in different directions depending upon the positional mounting of the unit.

The present invention provides a cord grommet and alternative seal member combination for a telephone unit, the grommet of flexible material and slidable into and out of a hole in the telephone unit housing, the grommet adapted to be inserted in either of two alternative positions, and providing a substantially air tight seal, the seal member adapted to clip into the hole in the housing to close the hole when a telephone cord is not being used.

The invention will be readily understood by the following description of one embodiment, by way of example, in conjunction with the accompanying drawings, in which.

Figure 13:
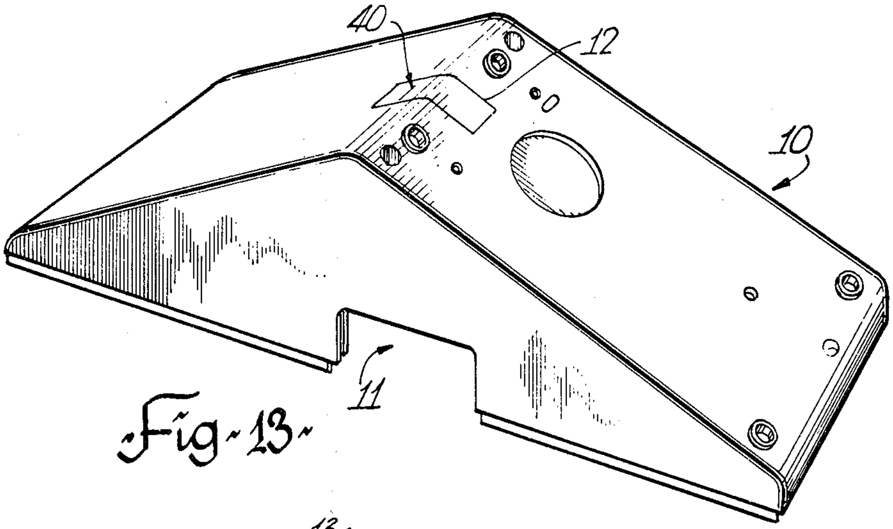
Figures 1, 2:
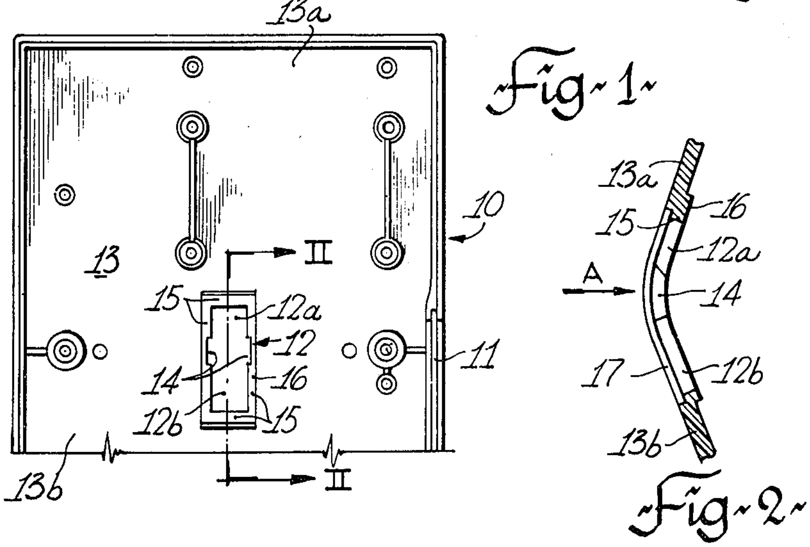
FIG. 1 is a plan view of the inside of a base housing for a telephone set.
FIG. 2 is a cross-section on the line II—II of FIG. 1.
Figures 3, 4A:
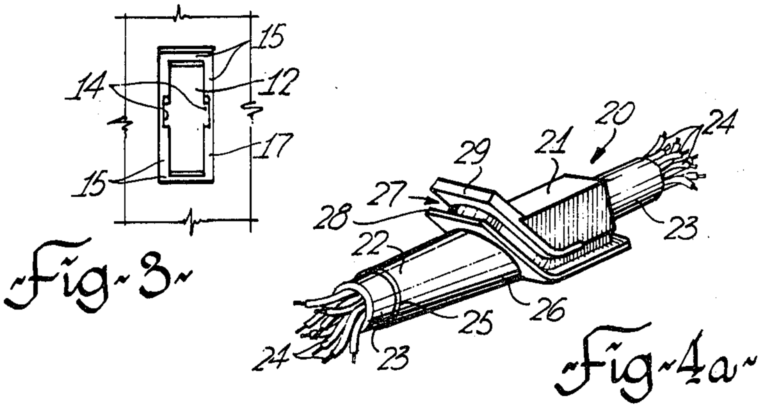
FIG. 3 is a view on the outside of the telephone set of FIGS. 1 and 2, in the direction of arrow A in FIG. 2.
Figure 12:
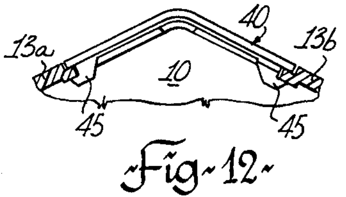
Figure 9:
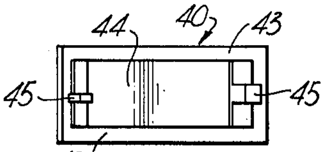
Figure 7:
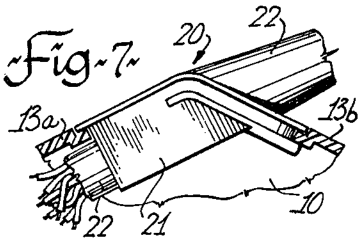
Figure 10:
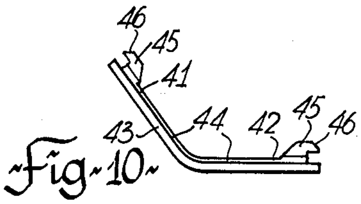
Figure 8:
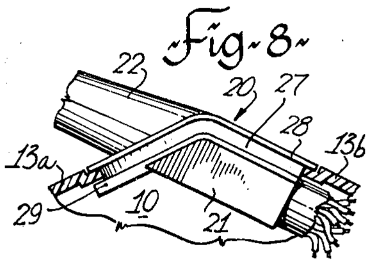
Figure 11:
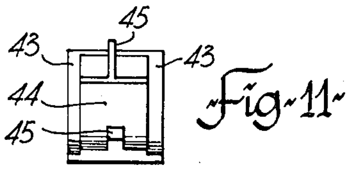

FIGS. 4, 4*a*, 5 and 6 are side, perspective and end views respectively of a grommet for use with the housing of FIGS. 1, 2 and 3;

FIGS. 7 and 8 are cross-sections, similar to that of FIG. 2, illustrating a grommet inserted in the base housing, in two alternative directions;

FIGS. 9, 10 and 11 are plan, side and end views of one form of a seal member for use with the housing of FIGS. 1, 2 and 3;

FIG. 12 is a cross-section similar to that of FIG. 2 illustrating a seal inserted in the aperture in the base housing, and FIG. 13 is a perspective view of the housing.

FIG. 1 illustrates a part of a base housing 10 for a telephone set. The set would normally have a speaker, a microphone, and associated circuit members and control items such as pushbuttons. In one side of the housing is formed an aperture, at 11, in which can be positioned one member of a connector or a blanking member. In one arrangement, for use with an asscoiated telephone set having a handset and also provision for a mating member of a connector, the housing 10 also has a member of a connector in the aperture 11. The two units are then interconnected by positioning them side-by-side and pushing them laterally together. The two members of the connector are mated and the connector also serves to mechanically connect the two sets together as well as electrically connecting them.

For use with a telephone set with handset but without the provision for side-by-side connection, provision for connection by a flexible cord is required. For this purpose an aperture 12 is formed in the bottom 13 of the base housing 10. Aperture 12 is elongate, with the longitudinal axis parallel to the longitudinal axis of the base 10. The base housing 10 is somewhat triangular in longitudinal cross-section and the bottom 13 of the housing base has two portions, rear portion **13*a* and forward portion 13*b***, the portions extending at an angle to each other. This is seen in FIG. 2.

The aperture 12 extends into both portions **13*a* and 13*b*. At the junction of the two portions the aperture 13 is slightly wider, at 14, than the remainder of the aperture. The aperture thus has a top portion 12*a* and a bottom portion 12*b*. The edges of the aperture are formed to provide a flange 15 which extends around three sides of each portion 12*a* and 12*b* of the aperture 12. The flange 15 is raised slightly at 16 on the inner side of the bottom 13 and recessed slightly at 17** from the outer side of the button, as seen in FIG. 2.

When in use, the telephone set of the base housing 10 will either be on a desk or similar horizontal surface, resting on portion **13*b* of the bottom, or will be mounted on a vertical surface with the portion 13*a* on the vertical surface. Depending upon the particular installation, the cord connecting the set — referred to as the speaker unit — to the conventional telephone set will need to issue from the base housing one of two alternate directions — beneath portion 13*b* for wall mounting and behind portion 13*a*** for desk mounting.

Figure 4:
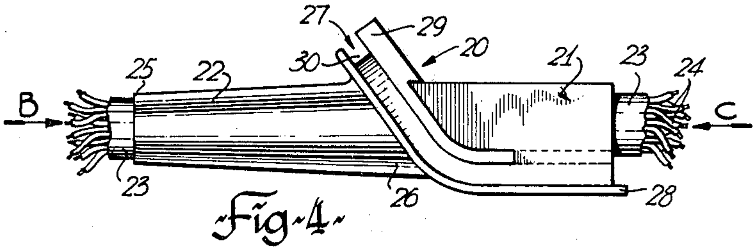
Figure 5:
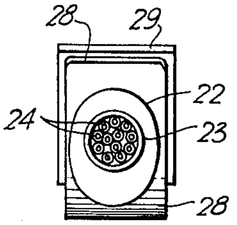
Figure 6:
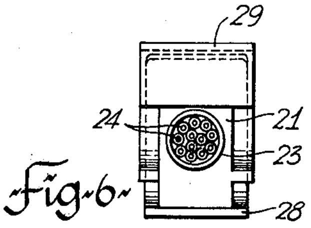

FIGS. 4, 5 and 6 illustrate a grommet for use with the connecting cord and which can be inserted in the aperture 12 of the base housing in either of two directions. FIG. 4 is a side view, the grommet 20 having inner and outer portions 21 and 22 respectively. A hole extends through the grommet for reception of flexible cord 23. Cord 23, and the hole in the grommet will vary in diameter according to the number of conductors 24. This number will vary on the particular application.

The outer portion 22 is tapered towards the outer end 25 and the cross-section varies from circular at the outer end 25 to somewhat oval at its inner end 26, although this shaping is not essential and can be varied. At the junction of the inner and outer portions 21 and 22 is formed a transverse channel formation 27 comprising two spaced apart channel members or flanges 28 and 29 with a groove 30 between them. The channel formation 27 is at an angle to the longitudinal axis of the grommet when viewed from the side, as in FIG. 4. The channel formation 27 extends down both sides of the grommet and across the top. The angle of inclination of the channel formation relative to the longitudinal axis of the grommet is the same as the angle subtended by the portions 13*a* and 13*b* of the bottom of the base housing 10 of FIGS. 1, 2 and 3.

The channel formation 27 extends along both sides of the inner portion 21 which is of square cross-section in the present example, as seen in FIG. 6. The flange 29 is somewhat thicker than the flange 28, flange 29 being relatively stiff while flange 28 is quite flexible. For ease of insertion, flange 29 only extends part way along the inner portion 21 of the grommet 20. Flange 28 is also slightly narrower than flange 29, as seen in FIGS. 5 and 6.

The grommet 20 is positioned on a cord prior to insertion in the base housing 10. The grommet is inserted from the inside of the housing, the cord being fed through the aperture 12 until the tapered outer portion 22 of the grommet is in the aperture. When the telephone set is to be used resting on a horizontal surface the grommet is inserted such that the outer portion 22 is directed rearwardly. For this way of insertion the outer portion 22 is positioned in portion 12*b* of the aperture 12 and extending approximately normal to the surface of portion 13*b* of the bottom of the base housing. By gently easing the grommet toward the portion 12*a* of the aperture the flange 28 is caused to move over the outside of the flange 15 extending along the sides of the aperture portion 12*a*. Flange 29 of the grommet moves over the inside of the flange 15. Thus the flange 15 around portion 12*a* of the aperture is in the groove 30 of the grommet. The grommet is eased forward and rotationed through approximately 90° until the two flanges 28 and 29 are in contact with the end of the aperture portion 12*a*. Assisted by slight pressure from the inside on the inner portion 21 of the grommet the thin resilient flange 28 adjacent the inner portion 21 is caused to flow past the flange 15 around portion 12*b* of the aperture 12 and rest over the outside of the flange 15. This is seen in FIG. 7.

Removal of the grommet is by reversal of the above. Pressure on the inner portion 21 of the grommet from the outside eases the flange 28 through portion 12*b* of the aperture. The grommet is then eased rearward and swung round through approximately 90°, disengaging the flanges 28 and 29, and the groove 30, from the flange 15 round the aperture portion 12*a*.

Insertion of the grommet 20 for use of the telephone set on a vertical surface is the opposite of the insertion for a horizontal surface. Thus the outer portion 22 of the grommet is directed forwardly. The grommet is inserted in the aperture 12 with the grommet in the portion 12*a*. The flanges 28 and 29 are engaged over the flange 15 around the aperture portion 12*b* and the grommet eased forward and round so that the flange 15 is in the groove 30 and flanges 28 and 29 on either side of the flange 15. When moved fully forward, the inner portion 21 of the grommet is pushed and the outer portion 22 slightly twisted back and forward and side to side to cause the flange 28 adjacent the inner portion 21 of the grommet to flex past the flange 15 around portion 12*a* of the aperture 12 and rest over the outside of the flange 15. This is seen in FIG. 8. Removal is again reversal of the above, first pushing on the inner portion 21 from the outside to ease the flange 28 through the aperture portion 12*a* and then easing the grommet forwardly and round to disengage the flanges 28 and 29, and the groove 30 from the flange 15 round the aperture portion 12*b*.

When the grommet is in position it hermetically seals the aperture 12. This is desirable, and may even be essential, for efficient operation of the speaker unit. Air leakage past the grommet can affect the efficiency of the loudspeaker. To seal the aperture 12 when a grommet is not in the aperture, as when the speaker unit is connected to the associated telephone set by side-by-side plug-in arrangement, a seal is positioned in the aperture 12. One form of seal is illustrated in FIGS. 9, 10 and 11.

As seen in FIGS. 9, 10 and 11 the seal 40 is rectangular in plan form and has two portions 41 and 42 which extend at an angle to each other, this angle being the same as the angle between the two portions 13*a* and 13*b* of the bottom 13 of the base housing 10. As is more readily apparent in FIG. 11, the periphery of the seal 40 is reduced in thickness to form a flange 43 extending around the periphery of the seal. This flange is such as to fit into the recess 17 around the aperture 12 in the base housing 10. The thicker portion 44 rests in the aperture 12 when the seal is in position in the base housing.

At each end of the seal 40 is a hooked member 45. The hooked members 45 have inclined outer ends at 46. To insert the seal, it is positioned over the aperture 12 from the outside and gently pushed. The inclined ends 46 cause the seal to deflect slightly and the hooked members move past the flange 15 at each end of the aperture 12 and then clip over the inside of the flange, as seen in FIG. 12. Alternatively one hooked member may be inserted through the aperture and engaged over the flange 15 and then the other hooked member pushed through by flexing the seal. To remove a seal it is merely pressed on from the inside at approximately the mid-point of the seal. This flexes the seal and disengages the hooked members 45 from the flange 15. The seal 40 seals the aperture 12 when a grommet is not being used and thus prevents inefficient operation of the loud speaker in the speaker unit. It also prevents ingress of dirt and other foreign matter which could detrimentally affect the circuitry and other parts of the unit positioned in the housing. When a grommet and flexible cord is being used, the aperture 11 is closed by a blanking member.

What is claimed is:

1. A telephone housing comprising:

a base surface comprising two portions, a front portion and a rear portion, the portions extending at an obtuse angle to each other;

an elongated aperture in said base surface, said aperture formed at the junction of said portions and including a bottom portion extending into said forward portion of said base surface and a top portion extending into said rearward portion of said base surface;

a cord grommet for positioning in said aperture, said grommet including inner and outer portions and a main body portion enclosing a telephone cord, a transverse channel formation extending for at least the major part of the periphery of the grommet, said channel formation including an inner flange of relatively stiff formation and an outer flange of very flexible formation, the channel formation extending at an angle across each side of said grommet at the junction of said inner and outer portions when viewed from a sideways direction, said angle relative to the longitudinal axis of the grommet and equal to the angle extended between said portions of said base surface, the channel formation also extending along each side of said inner portion of said grommet, said channel formation adapted to engage the periphery of the aperture in said base surface, said inner flange in contact with the inner side of the housing base surface and the outer flange in contact with the outer side of the housing base surface, the arrangement such that the channel formation extending at an angle across each side of the grommet is engaged with said bottom portion of said aperture in one direction of insertion of said grommet and in engagement with said top portion of said aperture in an alternate direction of insertion.

* * * * *